US009851873B2

(12) United States Patent
Yonaha

(10) Patent No.: US 9,851,873 B2
(45) Date of Patent: Dec. 26, 2017

(54) ELECTRONIC ALBUM CREATING APPARATUS AND METHOD OF PRODUCING ELECTRONIC ALBUM

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1 day.

(21) Appl. No.: 14/808,237

(22) Filed: Jul. 24, 2015

(65) Prior Publication Data
US 2015/0331566 A1 Nov. 19, 2015

Related U.S. Application Data

(63) Continuation of application No. PCT/JP2014/054489, filed on Feb. 25, 2014.

(30) Foreign Application Priority Data

Mar. 19, 2013 (JP) .................................. 2013-056867

(51) Int. Cl.
 G06F 3/00 (2006.01)
 G06F 3/0483 (2013.01)
 (Continued)

(52) U.S. Cl.
 CPC .......... *G06F 3/0483* (2013.01); *G06F 3/0486* (2013.01); *G06F 3/0488* (2013.01);
 (Continued)

(58) Field of Classification Search
 CPC ......... G06F 17/30247; G06F 17/30268; G06F 3/0482; G06F 17/30056; G06F 17/30256; G06F 3/04842; G06F 17/30244
 See application file for complete search history.

(56) References Cited

U.S. PATENT DOCUMENTS 6,810,149 B1 10/2004 Squilla et al.
7,868,924 B2 1/2011 Matsushita
(Continued)

FOREIGN PATENT DOCUMENTS

CN 101534392 A 9/2009
CN 101142818 B 6/2010
(Continued)

OTHER PUBLICATIONS

Extended European Search Report—EP 14 76 8694—dated Apr. 13, 2016.
(Continued)

*Primary Examiner* — Di Xiao
(74) *Attorney, Agent, or Firm* — Young & Thompson

(57) ABSTRACT

A family electronic album is created. Representative face images of a family are displayed. The representative face images are dragged and dropped onto corresponding areas among areas that identify family attributes ("father", "mother", etc.). Since the family attributes of the representative face images can be ascertained, the family attributes of face images that resemble these face images can be determined. Since images that include all family members and images that include some family members can be determined from among images that include face images the family attributes of which have been determined, these images are laid out in the electronic album.

10 Claims, 11 Drawing Sheets

(51) Int. Cl.

| | |
|---|---|
| *G06F 3/0486* | (2013.01) |
| *G06F 3/0488* | (2013.01) |
| *G06K 9/00* | (2006.01) |
| *H04N 1/46* | (2006.01) |
| *G06F 17/30* | (2006.01) |
| *H04N 1/00* | (2006.01) |
| *H04N 1/387* | (2006.01) |
| *G06T 11/00* | (2006.01) |

(52) U.S. Cl.
CPC .. *G06F 17/30247* (2013.01); *G06F 17/30265* (2013.01); *G06K 9/00221* (2013.01); *G06T 11/00* (2013.01); *H04N 1/00196* (2013.01); *H04N 1/00435* (2013.01); *H04N 1/00448* (2013.01); *H04N 1/00453* (2013.01); *H04N 1/00456* (2013.01); *H04N 1/00461* (2013.01); *H04N 1/387* (2013.01); *H04N 1/46* (2013.01)

(56) References Cited

U.S. PATENT DOCUMENTS

| | | | |
|---|---|---|---|
| 8,345,118 B2 | 1/2013 | Matsushita | |
| 8,411,968 B2 | 4/2013 | Isomura et al. | |
| 8,717,479 B2 | 5/2014 | Mori | |
| 8,867,849 B1* | 10/2014 | Kirkham | G06F 17/30268 382/224 |
| 9,495,583 B2* | 11/2016 | Gilley | G06F 17/30259 |
| 2004/0213553 A1 | 10/2004 | Nagahashi | |
| 2007/0159533 A1 | 7/2007 | Ayaki | |
| 2008/0028298 A1 | 1/2008 | Kaneko | |
| 2008/0062283 A1* | 3/2008 | Matsushita | G06F 17/30259 348/231.99 |
| 2008/0097994 A1 | 4/2008 | Teramoto et al. | |
| 2008/0298766 A1 | 12/2008 | Wen et al. | |
| 2009/0116752 A1* | 5/2009 | Isomura | G06F 17/30265 382/217 |
| 2009/0232364 A1 | 9/2009 | Hosoi | |
| 2011/0085055 A1 | 4/2011 | Matsushita et al. | |
| 2012/0013782 A1 | 1/2012 | Mori | |
| 2013/0101223 A1* | 4/2013 | Kawanishi | H04N 5/91 382/195 |
| 2013/0265334 A1* | 10/2013 | Brookhart | G06F 3/04812 345/672 |

FOREIGN PATENT DOCUMENTS

| | | |
|---|---|---|
| EP | 1 986 128 | 10/2008 |
| EP | 2 104 058 | 9/2009 |
| JP | 2002-140343 | 5/2002 |
| JP | 2002-335487 | 11/2002 |
| JP | 2004-234228 | 8/2004 |
| JP | 2006-295889 | 10/2006 |
| JP | 2007-041964 | 2/2007 |
| JP | 2007-143093 | 6/2007 |
| JP | 2008-107867 | 5/2008 |
| JP | 2009-048385 | 3/2009 |
| JP | 2010-014112 | 1/2010 |
| JP | 2010-057073 | 3/2010 |
| JP | 2012-023501 | 2/2012 |

OTHER PUBLICATIONS

International Search Report, PCT/JP2014/054489, dated May 13, 2014.
European Office Action dated Feb. 3, 2017; Application No. 14 768 694.3.
Chinese Office Action Application No. 201480008189.7; dated Jun. 27, 2017.

* cited by examiner

| FAMILY ATTRIBUTE | REPRESENTATIVE FACE IMAGE |
|---|---|
| FATHER |  104 |
| MOTHER |  103 |
| FIRST-BORN SON |  101 |
| FIRST-BORN DAUGHTER |  102 |
| GRANDFATHER |  105 |
| GRANDMOTHER |  106 |

*Fig. 8*

| FAMILY ATTRIBUTE | FACE IMAGE | | | | |
|---|---|---|---|---|---|
| FATHER | 104 | | | ......... | 114 |
| MOTHER | 103 | | | ......... | 113 |
| FIRST-BORN SON | 101 | | | ......... | 111 |
| FIRST-BORN DAUGHTER | 102 | | | ......... | 112 |
| GRANDFATHER | 105 | | | ......... | 115 |
| GRANDMOTHER | 106 | | | ......... | 116 | ns and 2013. e ap- e applic

ELECTRONIC ALBUM CREATING APPARATUS AND METHOD OF PRODUCING ELECTRONIC ALBUM

CROSS-REFERENCE TO RELATED APPLICATIONS

This application is a Continuation of PCT International Application No. PCT JP2014/054489 filed on Feb. 25, 2014, which claims priority under 35 U.S.C. §119(a) to Japanese Patent Application No. 2013-056867 filed Mar. 19, 2013. Each of the above application(s) is hereby expressly incorporated by reference, in its entirety, into the present application.

BACKGROUND OF THE INVENTION

Field of the Invention

This invention relates to an electronic album creating apparatus and to a method of creating an electronic album.

Description of the Related Art

An electronic album is an album that enables a number of images captured by a digital camera to be enjoyed in the same manner as a photograph album made of paper. Although a number of images are assigned automatically to each page constituting the electronic album to thereby create the album, there are occasions where the images of a specific individual become large or small in number. For this reason, there is a system adapted so as to create an electronic album that will not include images weighted toward those of a specific individual (Patent Document 1). Further, there is a system in which when a search word is designated, a person related to the designated search word is retrieved (Patent Document 2); a system that extracts a community having a relationship based upon a common topic (Patent Document 3); a system that retrieves photographs efficiently from parameters obtained by quantifying the degree of intimacy among people (Patent Document 4); a system that eliminates bias in terms of composition (Patent Document 5); and a system that facilitates the selection of images by a user (Patent Document 6).

Patent Document 1: Japanese Patent Application Laid-Open No. 2010-57073

Patent Document 2: Japanese Patent Application Laid-Open No. 2009-48385

Patent Document 3: Japanese Patent Application Laid-Open No. 2008-107867

Patent Document 4: Japanese Patent Application Laid-Open No. 2007-41964

Patent Document 5: Japanese Patent Application Laid-Open No. 2012-23501

Patent Document 6: Japanese Patent Application Laid-Open No. 2010-14112

However, the system described in Patent Document 1 merely prevents the number of images of a specific individual contained in an electronic album from becoming large or small. When an attempt is made to create an electronic album of a family, therefore, there are instances where, on average, images other than those of the family happen to be included in the album. In Patent Documents 2 to 6 as well, no consideration is given to the creation of an electronic album that contains the images of a family.

SUMMARY OF THE INVENTION

An object of the present invention is to create, with comparative ease, a family electronic album containing images of a family.

An electronic album creating apparatus according to the present invention comprises: an identification page display control device (identification page display control means) for controlling a display unit so as to display, on a display screen, an attribute identification page image and one or a plurality of representative face images included among a number of images that are for creating an electronic album, wherein the attribute identification page image has an attribute identification area, which identifies a family member attribute, formed per family member attribute; a correlation device (correlation means), responsive to a move instruction applied to a representative face image being displayed on the display screen to move the representative face onto an attribute identification area, for correlating the representative face image with the family member attribute identified by the attribute identification area for which the move instruction has been applied; a family member attribute detection device (family member attribute detection means) for detecting, from the relationship between the representative face image and family member attribute correlated by the correlation device, a family member attribute with regard to at least some of the images among the number of images for creating the electronic album; and an assigning device (assigning means) for assigning to each page, which will constitute the electronic album, at least some of the images among the number of images that are for creating the electronic album, the image being assigned based upon the family member attribute detected by the family member attribute detection device.

The present invention also provides a method of producing an electronic album. Specifically, the method comprises steps of: controlling a display unit so as to display, on a display screen, an attribute identification page image and one or a plurality of representative face images included among a number of images that are for creating an electronic album, wherein the attribute identification page image has an attribute identification area, which identifies a family member attribute, formed per family member attribute; in response to a move instruction applied to a representative face image being displayed on the display screen to move the representative face onto an attribute identification area, correlating the representative face image with the family member attribute identified by the attribute identification area for which the move instruction has been applied; detecting, from the relationship between the correlated representative face image and family member attribute, a family member attribute with regard to at least some of the images among the number of images that are for creating the electronic album; and assigning to each page, which will constitute the electronic album, at least some of the images among the number of images that are for creating the electronic album, the images being assigned based upon the detected family member attribute.

The present invention further provides a recording medium storing a program for controlling a computer of an electronic album creating apparatus.

According to the present invention, an attribute identification page image, in which an attribute identification area that identifies an attribute of a family member has been formed for every family member attribute, and one or a plurality of representative face images included among a number of images for creating an electronic album, are displayed on a display screen. Since a user who looks at the plurality of representative face images can tell whether the representative face images are those of the user's mother and father, etc., the user instructs the displayed representative face images to move onto the corresponding attribute identification areas by dragging or dragging and dropping the representative face images. Since the electronic album creating apparatus is capable of recognizing the family member attributes of these representative face images as a result of the move instruction, the representative face images and the family member attributes are brought into correlation. From the relationship between the correlated representative face images and family member attributes, a family member attribute regarding at least some of the images among the number of images for creating the electronic album is detected and, based upon the detected attribute, images are assigned to each page that will constitute the electronic album. Since the electronic album creating apparatus is capable of recognizing family member attributes ("father", "mother", "first-born son", "first-born daughter", etc.) with regard to respective images among a number of images for electronic album creation, a family electronic album can be created utilizing these attributes.

The apparatus may further comprise a principal person face image determination device (principal person face image determination means), responsive to the move instruction applied to a representative face image being displayed on the display screen to move the representative face onto an attribute identification area, for determining whether the representative face image is a face image of a principal person. In this case, the assigning device would, by way of example, assign images to each page, which will constitute the electronic album, in such a manner that a proportion of assigned images that include the principal person face image determined by the principal person face image determination device from among at least some of the images among the number of images that are for creating the electronic album will be larger than a proportion of other images.

The apparatus may further comprise a representative face image decision device (representative face image decision means) for deciding that a face image for which the number or size thereof included among the number of images for creating the electronic album is equal to or greater than a predetermined number or a predetermined size is a representative face image. In this case, the identification page display control device would, by way of example, display the identification page image and the face image, which has been decided by the representative face image decision device, on the display screen.

In a case where each page that will constitute the electronic album includes image assignment frames for which there have been decided family member attributes to which images will be assigned, the attribute assigning device would, by way of example, assign images, which have family member attributes corresponding to the family member attributes that have been decided for the image assignment frames, to the image assignment frames of each page that will constitute the electronic album.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is an example of a family attribute table;

DESCRIPTION OF THE PREFERRED EMBODIMENTS

Figure 1:
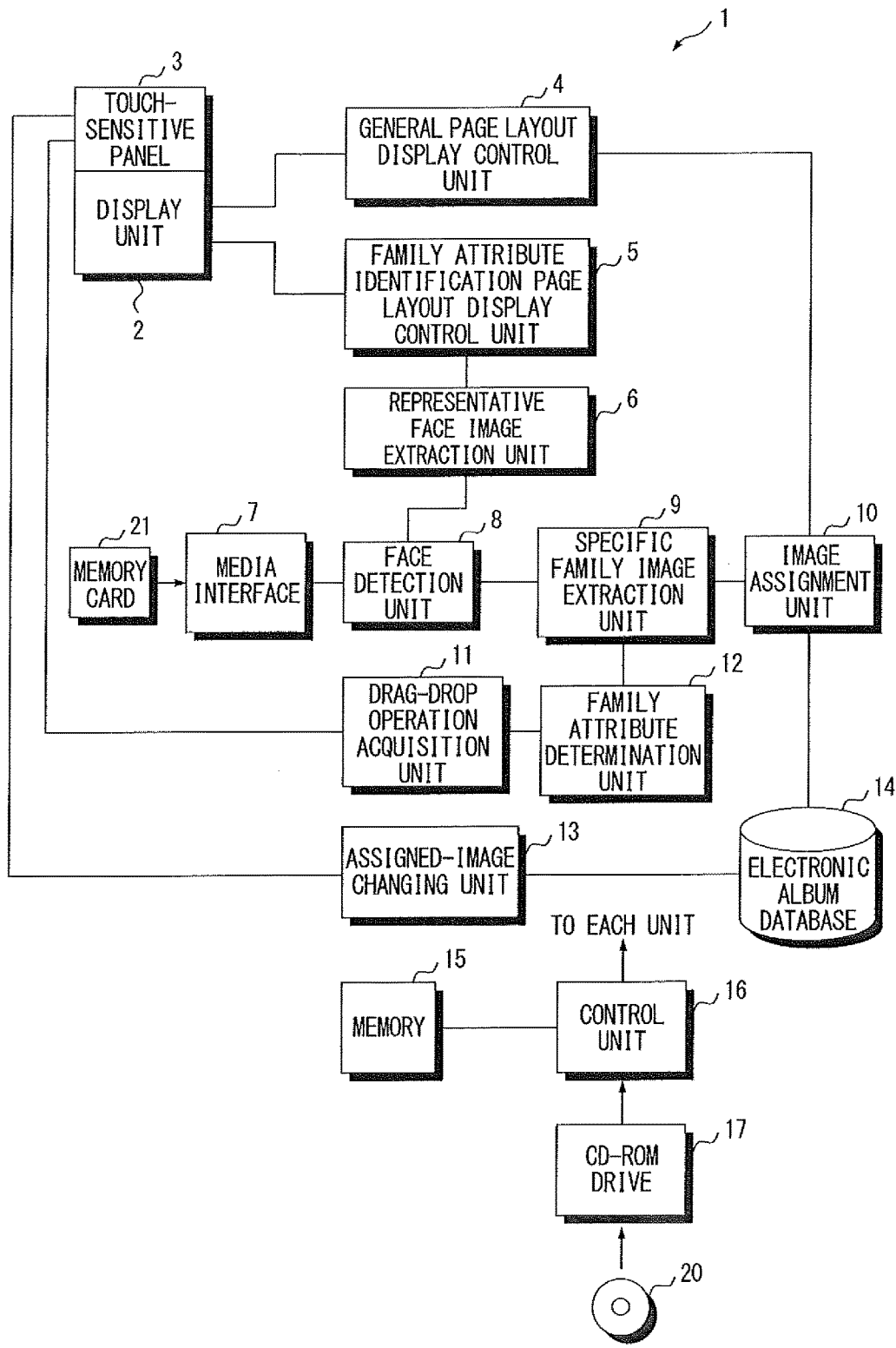
FIG. 1 is a block diagram illustrating the electrical configuration of an electronic album creating apparatus.

FIG. 1, which illustrates an embodiment of the present invention, is a block diagram showing the electrical configuration of an electronic album creating apparatus 1.

The overall operation of the electronic album creating apparatus 1 is controlled by a control unit 16.

A CD-ROM (Compact Disc-Read-Only Memory) 20 contains an operation program, described later. The operation program stored on the CD-ROM 20 is read by a CD-ROM drive 17 and installed in the electronic album creating apparatus 1. It may be arranged so as to install the program in the electronic album creating apparatus 1 via a network. In such case it goes without saying that the electronic album creating apparatus 1 incorporates a communication unit. Further, a memory 15 has been connected to the control unit 16.

When a memory card 21 (or other media) containing image data representing images to be assigned to an electronic album are brought to the apparatus by a user, image data representing a number of images constituting all or some of the images contained on the memory card 21 is read by a media interface 7. Face images are detected by a face detection unit 8 from among the images represented by the read image data. Since a number of face images are detected, face images representing the face of the same person are grouped together from among the number of face images. From among face images grouped for every person who is the same person, a representative face image is extracted for every same person by a representative face image extraction unit 6.

The electronic album creating apparatus 1 also includes a display unit 2 having a display screen on which a touch-sensitive panel 3 has been formed. A family attribute identification page is displayed on the display screen of the display unit 2 by a family attribute identification page layout display control unit 5. As will be described in detail later (with reference to FIGS. 4 and 5, etc.), family attribute areas that enable the electronic album creating apparatus 1 to identify the family attribute ("father" or "mother", etc.) of a person specified by a face image have been formed on the family attribute identification page in accordance with the family attribute. The representative face image extracted by the representative face image extraction unit 6 is displayed below the family attribute identification page. If the representative face image is dragged and dropped onto the family attribute area, information indicative of this drag-and-drop operation is input to a drag-drop operation acquisition unit 11. In response, based upon this operation information, a family attribute determination unit 12 determines that this representative face image possesses the family attribute defined for the family attribute area.

When family attributes regarding representative face images are detected, a page (a general page), which constructs an electronic album, for assigning (allocating, laying out) images is displayed on the display screen of the display unit 2 by a general page layout display control unit 4.

Defined on the general page are image assignment frames for each of which it has been decided which image having a particular family attribute will be assigned. Family attributes regarding all face images detected from the images that have been recorded on the memory card 21 are detected and images that include face images having family attributes corresponding to the family attributes that have been decided for image assignment frames are assigned by an image assignment unit 10 so as to be assigned to these image assignment frames. Data representing an electronic album thus generated is stored in an electronic album database 14.

The electronic album creating apparatus 1 further includes an assigned-image changing unit 13. With a page to which images have been assigned by the image assignment unit 10 as described above being displayed on the display screen of the display unit 2, an image that has been assigned to an image assignment frame can be changed by the user by dragging and dropping a desired image using the touch-sensitive panel 3.

The electronic album creating apparatus 1 described above is composed of hardware but a portion of the apparatus can also be composed of software. Further, a personal computer can be utilized to construct the electronic album creating apparatus 1. Ordinarily the electronic album creating apparatus 1 is installed in a supermarket or convenience store or the like. However, in a case where the electronic album creating apparatus 1 is constructed utilizing a personal computer, an electronic album can be created utilizing the user's personal computer located in the use's home.

Figure 2:
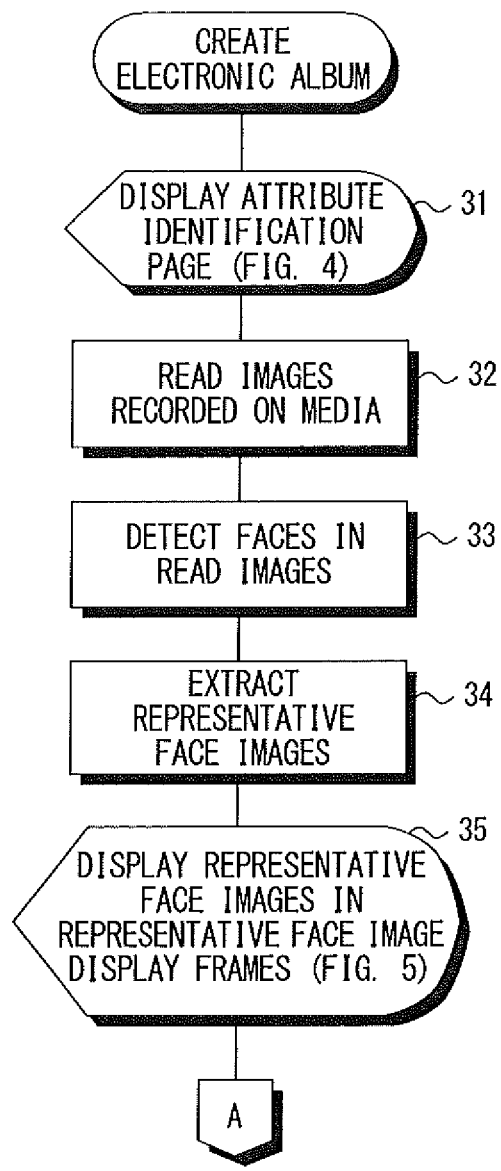
FIGS. 2 and 3 are flowcharts illustrating processing for creating an electronic album.
Figure 3:
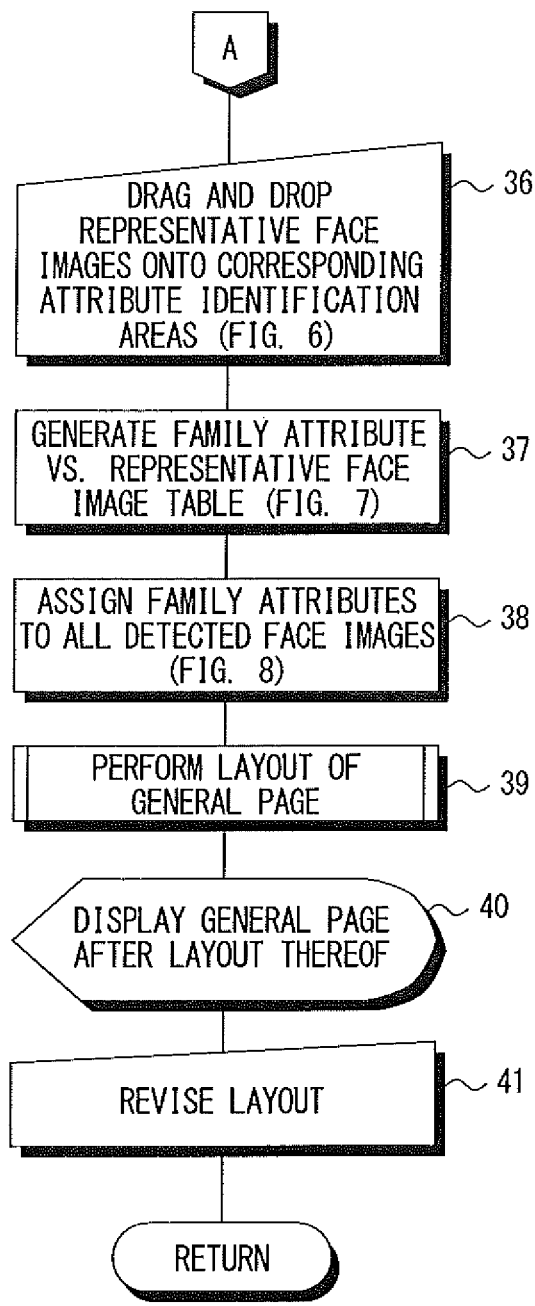
Figure 4:
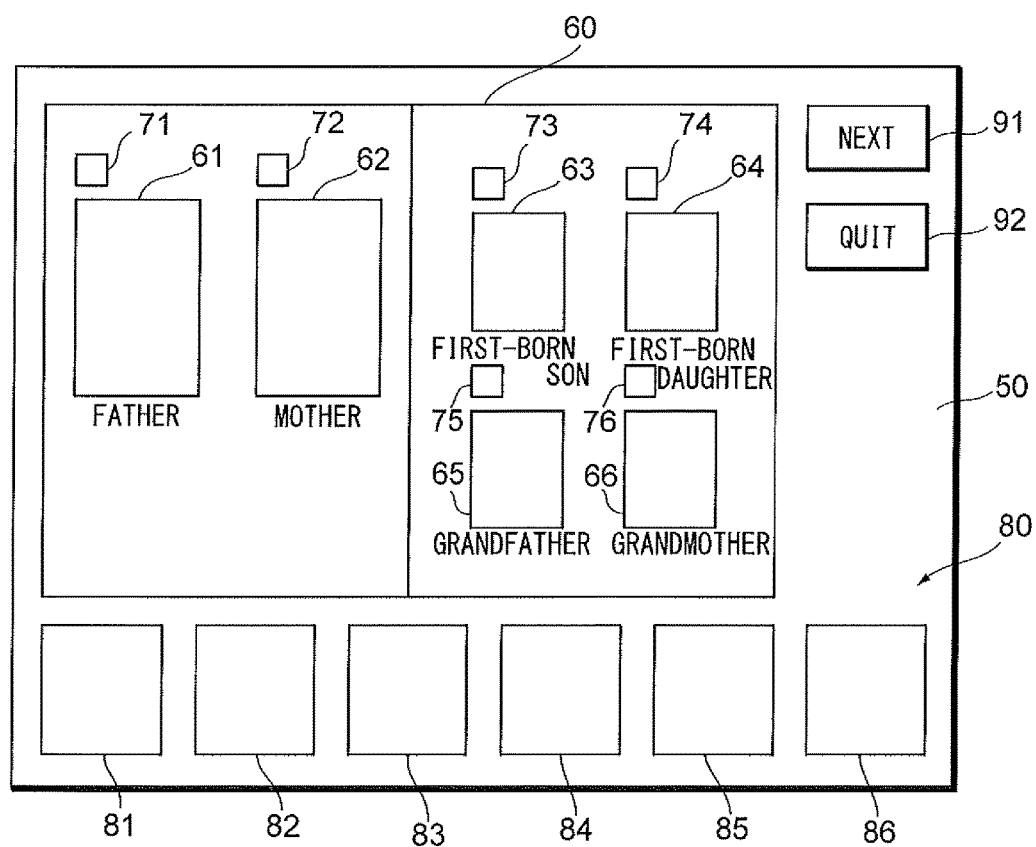
FIGS. 4 to 6 are examples of display screens.
Figure 5:
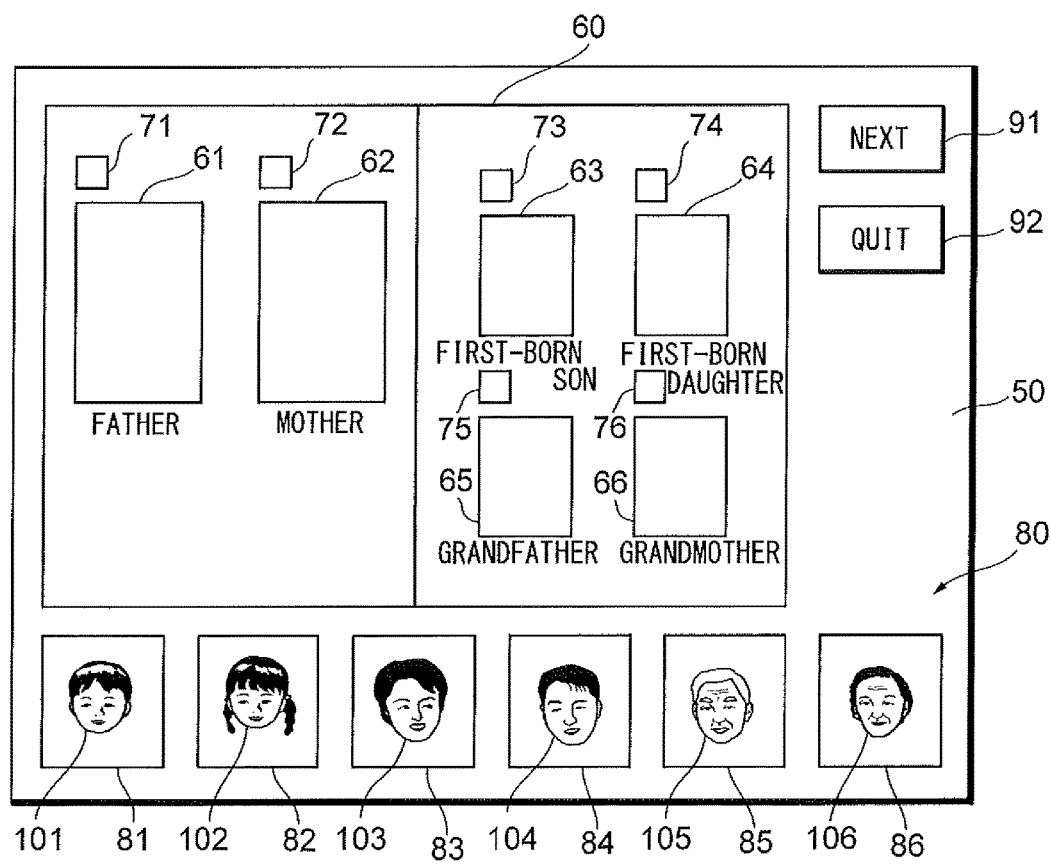
Figure 6:
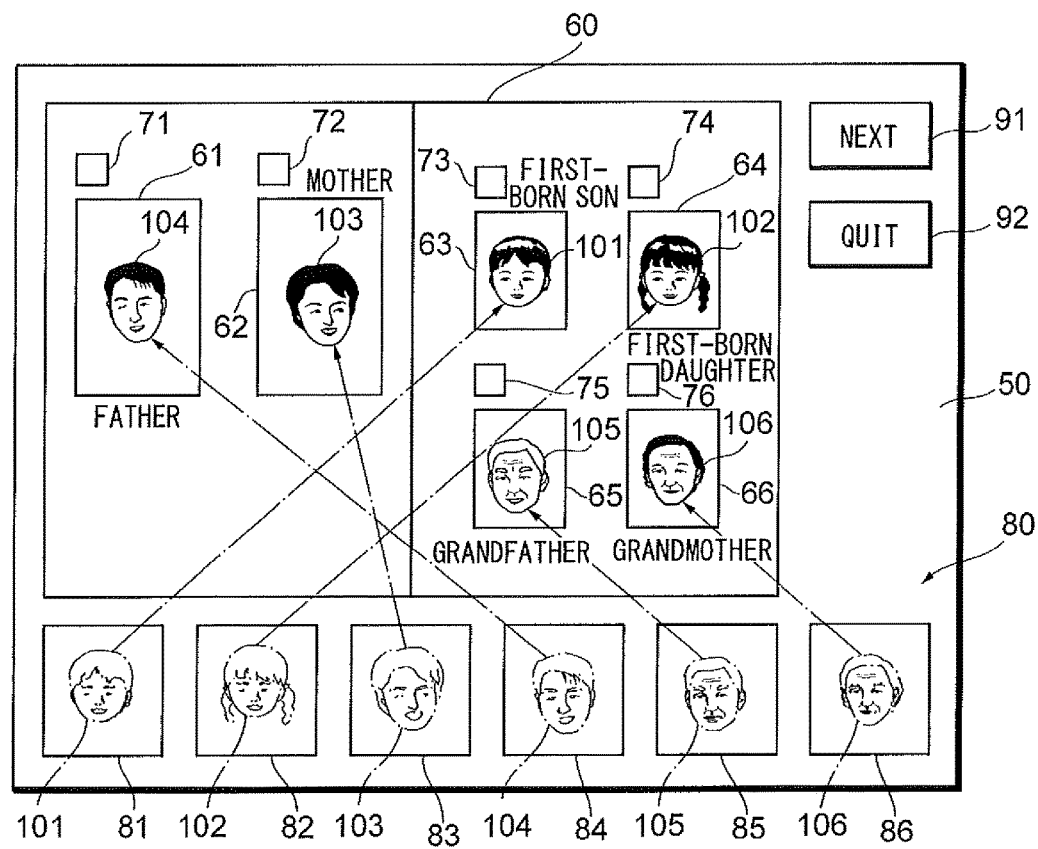

FIGS. 2 and 3 are flowcharts illustrating processing executed by the electronic album creating apparatus 1. FIGS. 4 to 6 illustrate the appearance of images displayed on a display screen 50 of the display unit 2.

When an electronic album is created, an attribute identification page is displayed on the display screen of the display unit 2 in the manner described above (step 31).

FIG. 4 is an example of an attribute identification page 60 displayed on the display screen 50 of the display unit 2.

A plurality of attribute identification areas 61 to 66 are formed on the attribute identification page 60. The attribute identification areas 61 to 66 are utilized in order that the user may designate which family attribute (the family-member type, such as "father" or "mother") is possessed by a person specified by a representative face image as described above. The attribute identification areas 61, 62, 63, 64, 65 and 66 are for designating the family attributes "father", "mother", "first-born son", "first-born daughter", "grandfather" and "grandmother", respectively. Other attributes may exist as well. Formed at the upper left of the attribute identification areas 61 to 66 are principal person check boxes 71 to 76, respectively, in correspondence with the attribute identification areas 61 to 66. If any check box among these principal person check boxes 71 to 76 is checked, images that include a face image having the family attribute designated by the area corresponding to the checked box will be assigned to the electronic album in a number greater than other images.

Defined below the attribute identification page 60 is a representative face image display area 80 in which representative face images are displayed as mentioned above. Multiple representative face image frames 81 to 86 in which representative face images will be displayed are formed in the representative face image display area 80. Formed at the upper right of the attribute identification page 60 are an area 91 touched by the user to proceed to the next process and on which characters reading "NEXT" are being displayed, and an area 92 touched by the user to quit creation of the electronic album and on which characters reading "QUIT" are being displayed.

With reference again to FIG. 2, the memory card 21 is loaded in the electronic album creating apparatus 1 and all image data contained on the memory card 21 is read (step 32). It may of course be arranged so as to read some of the image data instead of all of the image data contained on the memory card 21. When the image data is read, face detection processing is executed with regard to all of the image data read from the memory card 21 (step 33) and a number of face images are detected. The number of face images detected are grouped per identical person and person-by-person representative face images are extracted from among the groups of face images (step 34). The extracted representative face images are displayed in the representative face image display frames 81 to 86 described above (step 35).

FIG. 5 illustrates the manner in which representative face images are displayed in the representative face image display frames 81 to 86. Items in FIG. 5 identical with those shown in FIG. 4 are designated by like reference characters and need not be described again.

As set forth above, extracted representative face images 101 to 106 are being displayed in the representative face image display frames 81 to 86, respectively. These representative face images 101 to 106 indicate representatives of face images representing persons having a high frequency of appearance from among the persons contained in the images that have been read from the memory card 21 without relation to family attribute. The representative face images 101, 102, 103, 104, 105 and 106 are representative face images of "first-born son", "first-born daughter", "mother", "father", "grandfather" and "grandmother", respectively.

From among the representative face images 101 to 106 being displayed in the representative face image display frames 81 to 86, respectively, any representative face image is dragged and dropped by the user onto the family attribute identification area having the same attribute as that of this representative face image (step 36 in FIG. 3).

FIG. 6 illustrates the manner in which the representative face images 101 to 106 are dragged and dropped by the user.

If the user looks at the representative face images 101 to 106 being displayed in the representative face image display frames 81 to 86, respectively, the user can ascertain the family attributes of the respective representative face images 101 to 106. The user therefore looks at the representative face images 101 to 106 being displayed in the representative face image display frames 81 to 86 and drags and drops these representative face images onto whichever of the family attribute identification frames 61 to 66 that correspond to the family attributes of the representative face images among the representative face images 101 to 106. For example, since the family attributes of the representative face images 101 to 106 are "first-born son", "first-born daughter", "mother", "father", "grandfather" and "grandmother", respectively, the representative face images 101 to 106 are dragged and dropped onto the family attribute identification frames 63, 64, 62, 61, 65 and 66, respectively, by the user. When this is done, the dragged-and-dropped representative face images 101, 102, 103, 104, 105 and 106 are displayed in the family attribute identification frames 63, 64, 62, 61, 65 and 66, respectively. If a representative face image is mistakenly dragged and dropped onto a family attribute identification frame having a different family attribute, this can be corrected by dragging and dropping this dragged-and-dropped image onto the original one of the representative face image display frames 81 to 86.

Next, a family attribute vs. representative face image table indicating which family attribute is possessed by a representative face image is generated (step 37 in FIG. 3).

Figure 7:
FIG. 7 is an example of a family attribute vs. representative face image table.
Figure 7:
Figure 7:
Figure 7:
Figure 7:
Figure 7:

FIG. 7 is an example of a family attribute vs. representative face image table.

As mentioned above, the electronic album creating apparatus 1 recognizes the family attributes of the representative face images 101 to 106 as a result of the user dragging and dropping the representative face images 101 to 106 onto the family attribute identification frames 61 to 66. For example, the fact that the family attribute of the representative face image 104 is "father" is recognized by the electronic album creating apparatus 1. As a result, the electronic album creating apparatus 1 recognizes "father" as the family attribute of face images representing faces considered identical with the face specified by the representative face image 104. Similarly, the electronic album creating apparatus 1 recognizes that the family attributes of the representative face images 103, 101, 102, 105 and 106 are "mother", "first-born son", "first-born daughter", "grandfather" and "grandmother", respectively. The electronic album creating apparatus 1 recognizes "mother", "first-born son", "first-born daughter", "grandfather" and "grandmother" as the family attributes of face images representing faces considered identical with the faces specified by the representative face images 103, 101, 102, 105 and 106.

When the family attributes of the representative face images 101 to 106 are recognized by the electronic album creating apparatus 1, the family attributes are assigned with regard to all of the number of face images detected from the number of images represented by the image data that has been read from the memory card 21 (step 38 in FIG. 3).

FIG. 8 is an example of a family attribute table in which family attributes have been assigned to a detected number of face images.

If it can be determined to which person among persons of representative face images a detected face image belongs, then the family attribute of the representative face image of this person will be the family attribute of the detected face image. The family attribute of a face image that resembles a representative face image will be the family attribute of the representative face image to which there is the resemblance. For example, if it is determined that detected representative face images 114 resemble the representative face image 104, then the family attribute of the face images 114 will be "father". Similarly, if it is determined that detected face images 113, 111, 112, 115 and 116 resemble the representative face images 103, 101, 102, 105 and 106, then the family attributes of the face images 113, 111, 112, 115 and 116 will be "mother", "first-born son", "first-born daughter", "grandfather" and "grandmother", which are the family attributes of the representative face images 103, 101, 102, 105 and 106.

With reference to FIG. 3, layout of the general page constituting the electronic album is performed when family attributes are assigned with regard to all detected face images (step 39). When layout is performed, the general page is displayed on the display screen 50 (step 40). If necessary, the layout is revised (step 41).

Figure 9:
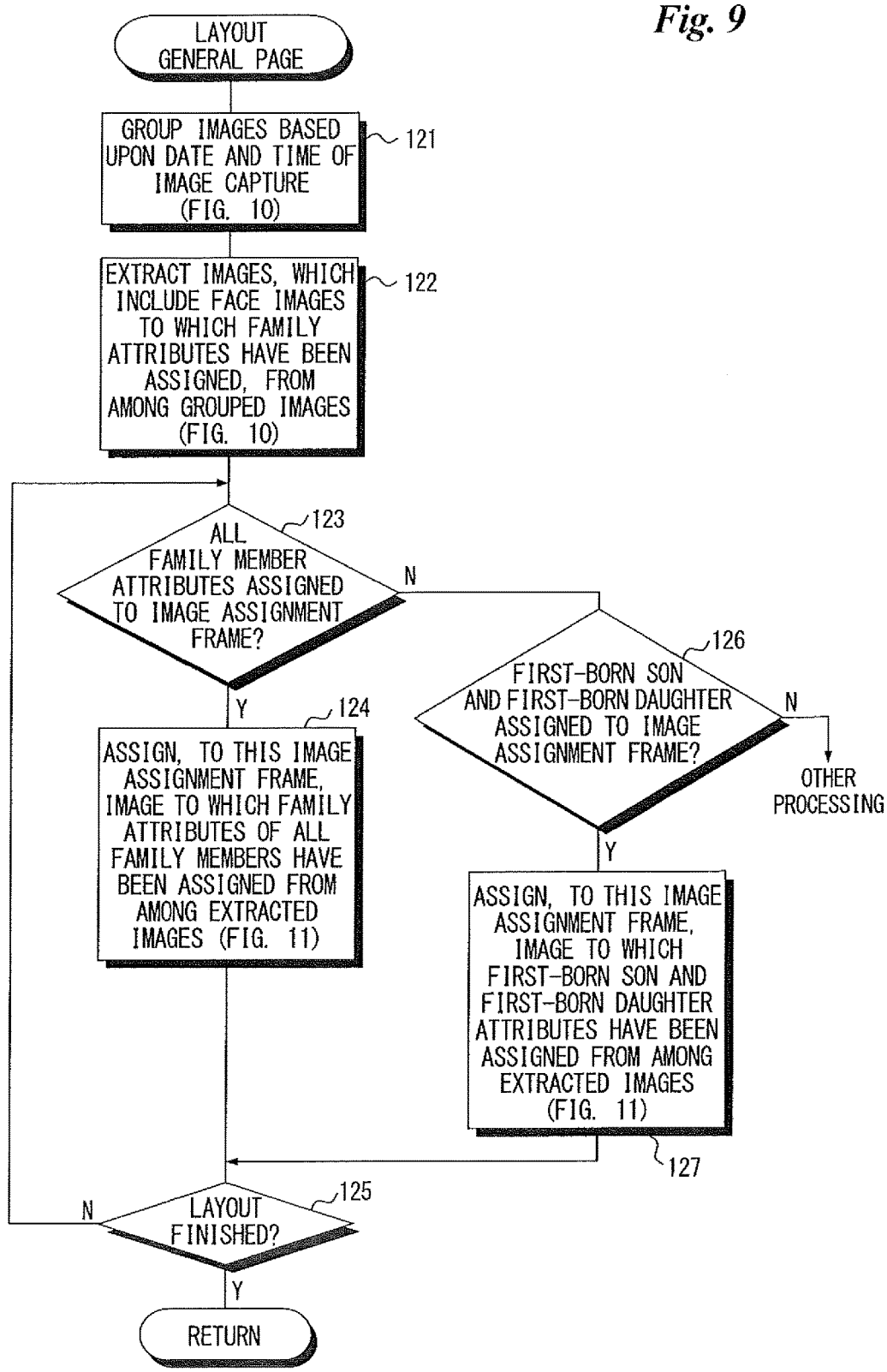
FIG. 9 is a flowchart illustrating general page layout processing.

FIG. 9 is a flowchart illustrating general page layout processing (the processing of step 39 in FIG. 3).

First, a number of images represented by image data that has been read from the memory card 21 are grouped based upon the date and time of image capture (step 121). It goes without saying that the date and time of image capture will have been recorded in the header of the file containing the image data. When the number of images are grouped, images that include face images to which family attributes have been assigned are extracted from among the image groups (step 122).

Figure 10:
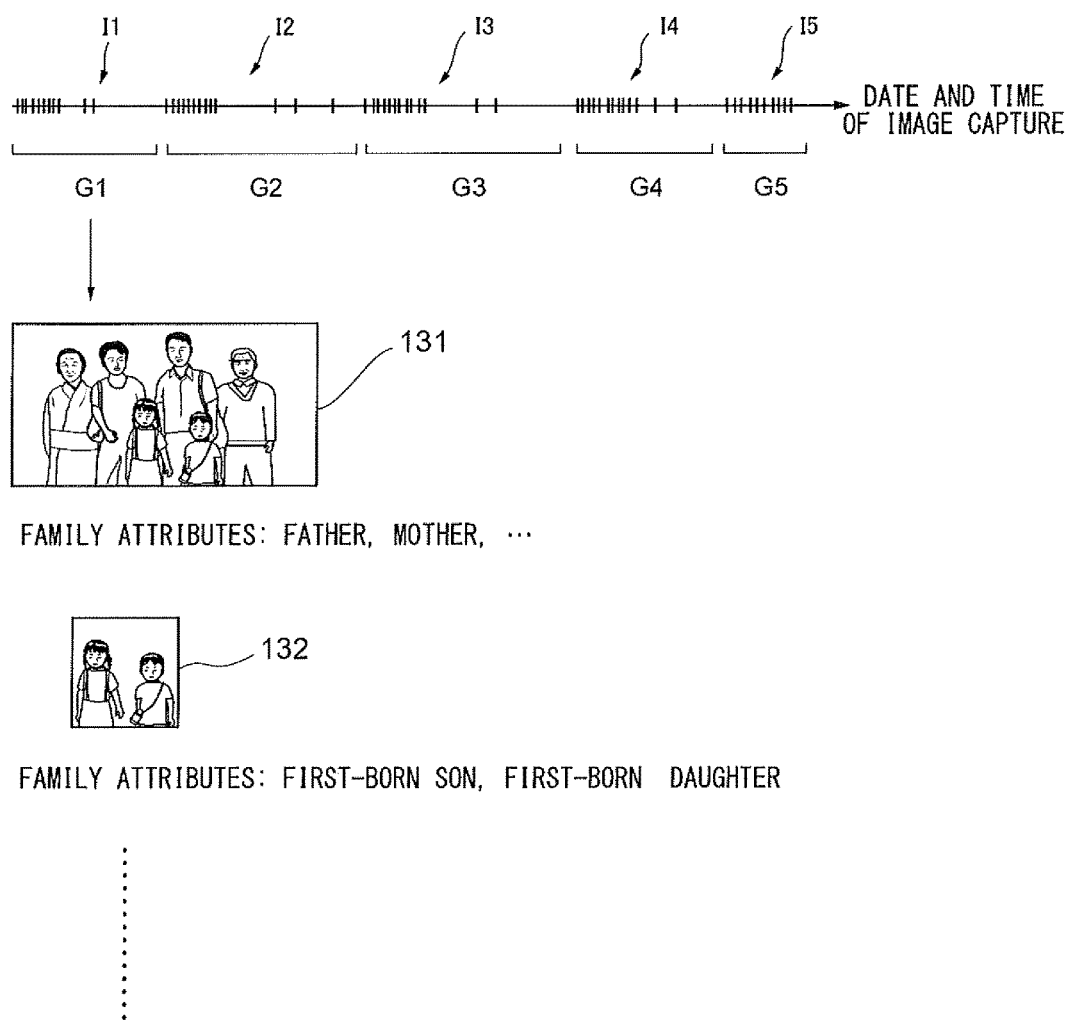
FIG. 10 illustrates the manner in which images are extracted.

FIG. 10 illustrates the manner in which images are extracted at step 122 of FIG. 9.

The top of FIG. 10 expresses images, which have been obtained by image capture, in the order of date and time of capture in a case where date and time of capture is plotted along the horizontal axis. There are a plurality of image groups I1 to I5, which are grouped into five groups G1 to G5. In each group of the groups G1 to G5, images that include face images to which family attributes have been assigned are extracted. For example, images such as an image 131 and an image 132 are extracted from the group G1. The image 131 includes all of the face images, namely the face image having the "father" family attribute, the face image having the "mother" family attribute, the face image having the "first-born son" family attribute, the face image having the "first-born daughter" family attribute, the face image having the "grandfather" family attribute and the face image having the "grandmother" family attribute. The image 132 includes the face image having the "first-born son" family attribute and the face image having the "first-born daughter" family attribute. The situation in similar with regard to the other groups G2 to G5 as well.

Figure 11:
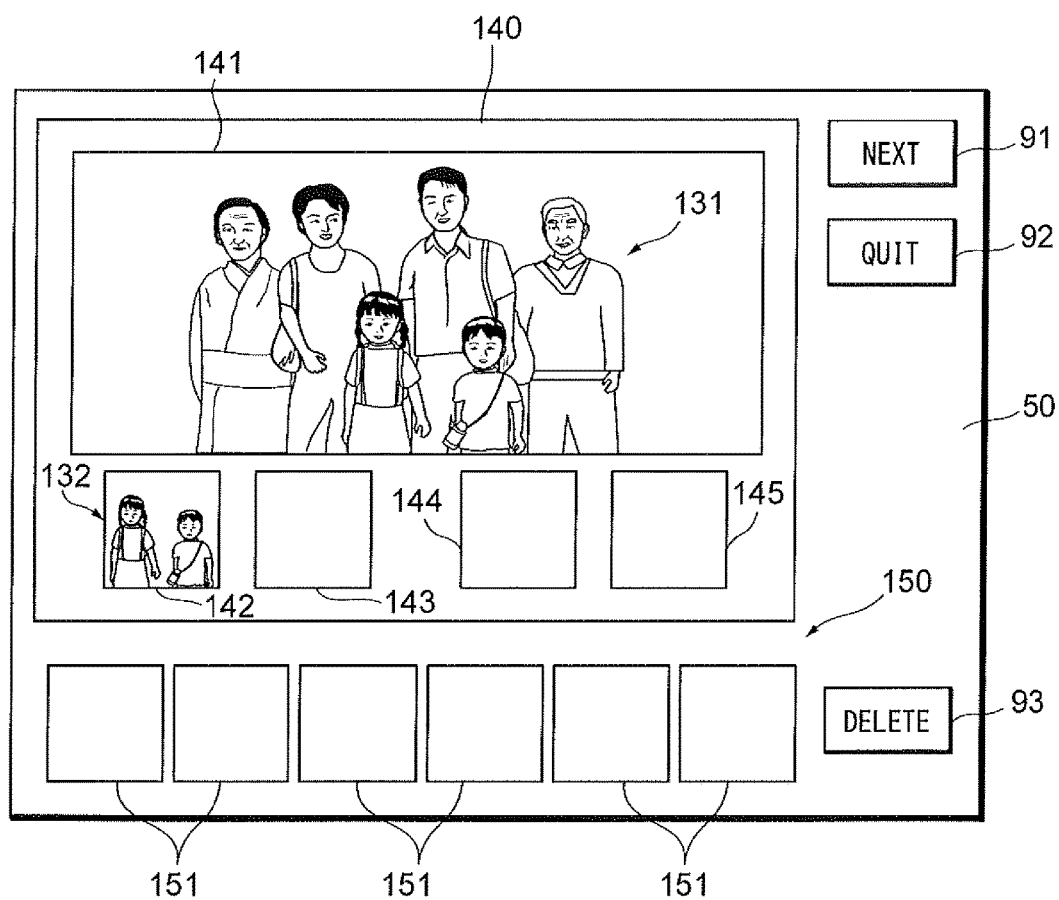
FIG. 11 is an example of a display screen.

FIG. 11 is an example of the display screen 50 on which a general page 140 is being displayed. Items in FIG. 11 identical with those shown in FIG. 4, etc., are designated by like reference characters and need not be described again.

A plurality of image assignment frames 141 to 145 to which images will be assigned are defined on the general page 140. The layout of the image assignment frames 141 to 145 will differ if the general page differs. The family attributes possessed by the face images included in the images that will be assigned have been decided for the image assignment frames 141 to 145 as mentioned above. For example, all of the family attributes, namely the "father", "mother", "first-born son", "first-born daughter", "grandfather" and "grandmother" family attributes, have been decided for the image assignment frame 141. The electronic album creating apparatus therefore assigns to the image assignment frame 141 an image that includes face images having all of these family attributes. For example, since the image 131 extracted from the group G1 as shown in FIG. 10 includes face images corresponding to all of the family attributes, namely the "father", "mother", "first-born son", "first-born daughter", "grandfather" and "grandmother" family attributes, this image 131 is assigned to the image assignment frame 141. A similar situation holds for the other image assignment frames 142 to 145 as well. For example, if the "first-born son" and "first-born daughter" family attributes have been decided for the image assignment frame 142, an image that includes a face image having the "first-born son" family attribute and a face image having the "first-born daughter" family attribute will be assigned as shown in FIG. 11.

A number of image display frames 151 are formed below the general page 140. Images contained in group G1 and for which face images have been detected (though these may just as well be images for which face images have not been detected) are displayed in these image display frames 151. Further, an area 93 bearing characters reading "DELETE" is being displayed at the lower right of the display screen 50. When images that have been assigned to the image assignment frames 141 to 145 of the general page 140 are to be changed, dragging and dropping the images being displayed in these frames onto the area 93 will cause these displayed images to be removed from their image assignment frames. By dragging and dropping images being displayed in the image display frames 151 onto the image assignment frames from which images have been removed, the images that were being displayed in the image assignment frames are caused to change.

With reference again to FIG. 9, if an image assignment frame is one to which the family attributes of all family members have been assigned ("YES" at step 123), then the image 131, which is one in which the family attributes of the included face images will be the family attributes of all of the family members, is assigned to this image assignment frame in the manner described above (step 124). Further, if an image assignment frame is one to which the "first-born son" and "first-born daughter" family attributes have been assigned ("YES" at step 126), then the image 132, which is one in which the family attributes of the included face images will be the "first-born son" and "first-born daughter" family attributes, is assigned to this image assignment frame in the manner described above (step 127). With regard to the image assignment frames to which the other family attributes have been assigned as well, images that include face images having the corresponding family attributes will be assigned in a similar manner.

With regard to an image assignment frame for which a family attribute has not been decided, an image that includes a face image may be assigned to this image assignment frame, or it may be arranged so that in a case where a principal person has been designated by the principal person check boxes 71 to 76 (see FIG. 4, etc.) as described above, an image that includes this principal person will be assigned preferentially. As a result, the electronic album will undergo an increase in the proportion of images that include the principal person.

As many apparently widely different embodiments of the present invention can be made without departing from the spirit and scope thereof, it is to be understood that the invention is not limited to the specific embodiments thereof except as defined in the appended claims.

What is claimed is:

1. An electronic album creating apparatus comprising:
   an identification page display control device configured to control a display unit to display, on a display screen, an attribute identification page image and one or a plurality of representative face images included among a number of images that are for creating an electronic album, the attribute identification page image having an attribute identification area, which identifies a family member attribute showing a relationship with respect to a family, formed per family member attribute;
   a correlation device, responsive to a move instruction applied to a representative face image being displayed on the display screen to move the representative face onto an attribute identification area, configured to correlate the representative face image with the family member attribute identified by the attribute identification area for which the move instruction has been applied, the representative face image being extracted from a plurality of face images including a same person as representing the face of the person;
   a family member attribute detection device configured to detect, from the relationship between the representative face image and the family member attribute correlated by said correlation device, a family member attribute with regard to at least some of the images among the number of images that are for creating the electronic album; and
   an assigning device configured to assign to an image assignment frame of each page, which will constitute the electronic album, a plurality of the images among the number of images that are for creating the electronic album, the images being assigned based upon a plurality of the family member attributes detected by said family member attribute detection device, each of the images being associated with its own family member attribute,
   wherein the plurality of images respectively associated with a different family member attribute are displayed in the same image assignment frame, and
   one or more processors is configured to execute the identification page display control device, the correlation device, the family member attribute detection device, and the assigning device.

2. The apparatus according to claim 1, further comprising a principal person face image determination device, responsive to the move instruction applied to a representative face image being displayed on the display screen to move the representative face onto an attribute identification area, for determining whether the representative face image is a face image of a principal person,
   wherein said assigning device assigns images to each page, which will constitute the electronic album, in such a manner that a proportion of assigned images that include the principal person face image determined by said principal person face image determination device from among at least some of the images among the number of images that are for creating the electronic album will be larger than a proportion of other images.

3. The apparatus according to claim 1, further comprising a representative face image decision device for deciding that a face image for which the number or size thereof included among the number of images that are for creating the electronic album is equal to or greater than a predetermined number or a predetermined size is a representative face image,
   wherein said identification page display control device displays the identification page image and the face image, which has been decided by said representative face image decision device, on the display screen.

4. The apparatus according to claim 1, wherein each page that will constitute the electronic album includes image assignment frames for which there have been decided family member attributes to which images will be assigned,
   said attribute assigning device assigning images, which have family member attributes corresponding to the family member attributes that have been decided for the image assignment frames, to the image assignment frames of each page that will constitute the electronic album.

5. The apparatus according to claim 1, wherein the attribute identification area is displayed on the attribute identification page other than in a tree view.

6. The apparatus according to claim 1, wherein the family member attribute includes an all family member attribute.

7. The apparatus according to claim 1, wherein the size of the attribute identification area is different depending on a type of attribute.

8. A method of producing an electronic album, comprising:
   controlling a display unit to display, on a display screen, an attribute identification page image and one or a plurality of representative face images included among a number of images that are for creating an electronic album, the attribute identification page image having an attribute identification area, which identifies a family member attribute showing a relationship with respect to a family, formed per family member attribute, the representative face image being extracted from a plurality of face images including a same person as representing the face of the person;

in response to a move instruction applied to a representative face image being displayed on the display screen to move the representative face onto an attribute identification area, correlating the representative face image with the family member attribute identified by the attribute identification area for which the move instruction has been applied;

detecting, from the relationship between the correlated representative face image and family member attribute, a family member attribute with regard to at least some of the images among the number of images that are for creating the electronic album; and assigning to an image assignment frame of each page, which will constitute the electronic album, a plurality of the images among the number of images that are for creating the electronic album, the images being assigned based upon a plurality of the detected family member attributes, each of the images being associated with its own family member attribute, and wherein the plurality of images respectively associated with a different family member attribute are displayed in the same image assignment frame.

9. A non-transitory recording medium storing a computer-readable program for controlling a computer of an electronic album creating apparatus to:

display, on a display screen, an attribute identification page image and one or a plurality of representative face images included among a number of images that are for creating an electronic album, wherein the attribute identification page image has an attribute identification area, which identifies a family member attribute showing a relationship with respect to a family, formed per family member attribute, the representative face image being extracted from a plurality of face images including a same person as representing the face of the person;

in response to a move instruction applied to a representative face image being displayed on the display screen to move the representative face onto an attribute identification area, correlate the representative face image with the family member attribute identified by the attribute identification area for which the move instruction has been applied;

detect, from the relationship between the correlated representative face image and family member attribute, a family member attribute with regard to at least some of the images among the number of images that are for creating the electronic album; and assign to an image assignment frame of each page, which will constitute the electronic album, a plurality of the images among the number of images that are for creating the electronic album, the images being assigned based upon the detected family member attribute, each of the images being associated with its own family member attribute, wherein the plurality of images respectively associated with a different family member attribute are displayed in the same image assignment frame.

10. An electronic album creating apparatus comprising:

at least one processor configured to control a display unit to display, on a display screen, an attribute identification page image and one or a plurality of representative face images included among a number of images that are for creating an electronic album, the attribute identification page image having an attribute identification area, which identifies a family member attribute showing a relationship with respect to a family, formed per family member attribute, the representative face image being extracted from a plurality of face images including a same person as representing the face of the person, correlate, responsive to a move instruction applied to a representative face image being displayed on the display screen to move the representative face onto an attribute identification area, the representative face image with the family member attribute identified by the attribute identification area for which the move instruction has been applied, the representative face image being extracted from a plurality of face images including a same person as representing the face of the person, detect, from the relationship between the representative face image and the family member attribute that are correlated, a family member attribute with regard to at least some of the images among the number of images that are for creating the electronic album, and assign to an image assignment frame of each page, which will constitute the electronic album, a plurality of the images among the number of images that are for creating the electronic album, the images being assigned based upon a plurality of the detected family member attributes, each of the images being associated with its own family member attribute, wherein the plurality of images respectively associated with a different family member attribute are displayed in the same image assignment frame.

* * * * *